United States Patent

Nakahara et al.

[11] Patent Number: 5,879,497
[45] Date of Patent: Mar. 9, 1999

[54] ALIGNMENT DEVICE AND RUBBING CLOTH FOR ALIGNMENT WITH RESPECT TO LIQUID CRYSTAL DISPLAY DEVICE-USE SUBSTRATE, AND METHOD FOR MANUFACTURING A LIQUID CRYSTAL DISPLAY DEVICE

[75] Inventors: Makoto Nakahara, Nara; Kazuya Yoshimura, Kitakatsuragi-gun, both of Japan

[73] Assignee: Sharp Kabushiki Kaisha, Osaka, Japan

[21] Appl. No.: 685,745

[22] Filed: Jul. 24, 1996

[30] Foreign Application Priority Data

Sep. 6, 1995 [JP] Japan .................................. 7-229336

[51] Int. Cl.⁶ .................................................. G02F 1/1337
[52] U.S. Cl. ............................ 156/99; 156/295; 349/126; 492/29
[58] Field of Search ................................ 359/76; 156/99, 156/295; 349/126; 492/29

[56] References Cited

U.S. PATENT DOCUMENTS

| | | | |
|---|---|---|---|
| 3,771,428 | 11/1973 | Horner et al. | 118/103 X |
| 4,402,999 | 9/1983 | Tatsumichi et al. | 427/126.3 |
| 5,221,981 | 6/1993 | Kodera et al. | 359/76 |
| 5,422,750 | 6/1995 | Kodera et al. | 359/76 |
| 5,455,695 | 10/1995 | Kodera et al. | 359/76 |

FOREIGN PATENT DOCUMENTS

| | | |
|---|---|---|
| 40652 | of 1979 | Japan . |
| 240522 | of 1988 | Japan . |
| 22624 | of 1990 | Japan . |
| 33030 | of 1990 | Japan . |

*Primary Examiner*—Francis J. Lorin
*Attorney, Agent, or Firm*—David G. Conlin; William J. Daley, Jr.

[57] ABSTRACT

An alignment device for aligning a liquid crystal display device-use substrate is a rubbing device provided with a rubbing roller, the rubbing roller being composed of a rotary roller and a rubbing cloth, the rubbing cloth being provided around the circumferential surface of the rotary roller. The rubbing device carries out alignment by rotating the rubbing roller so as to rub an alignment film formed on the surface of the liquid crystal display device-use substrate, in a specific direction with piles provided on the rubbing cloth. One of the directions of the pile lines of the rubbing roller provided around the rotary roller is tilted to the rotation direction of the rotary roller. With this arrangement, "irregular display with stripes" occurring to a liquid crystal display device is restrained, which is caused by uneven strength of touches of the piles to the alignment film, such uneven strength of touches resulting from positions of the piles which are provided in the rubbing cloth provided in the rubbing roller.

19 Claims, 12 Drawing Sheets

5,879,497

ALIGNMENT DEVICE AND RUBBING CLOTH FOR ALIGNMENT WITH RESPECT TO LIQUID CRYSTAL DISPLAY DEVICE-USE SUBSTRATE, AND METHOD FOR MANUFACTURING A LIQUID CRYSTAL DISPLAY DEVICE

FIELD OF THE INVENTION

The present invention relates to (1) an alignment device and (2) rubbing cloth, which are employed in an operation of rubbing an alignment film in a specific direction so as to carry out alignment, the alignment film being provided on a liquid crystal display device-use substrate and controlling the alignment direction of liquid crystal, and (3) a method for manufacturing a liquid crystal display device incorporating liquid crystal display device-use substrates to which an alignment operation has been carried out by the above alignment device and the above rubbing cloth.

BACKGROUND OF THE INVENTION

A primary task in producing conventional liquid crystal display (LCD) devices was to make a greatest possible contrast, since a greater monochromic contrast was demanded. However, as LCD devices have been incorporated in multimedia apparatuses recently and the quality of picture of personal computer software has been enhanced due to CD-ROM (Compact Disk Read Only Memory) or the like, to achieve regularity of display in half tone, that is, how to obtain half tone display without irregularity, has become an important task. The quality of such half tone display is greatly affected by alignment of liquid crystal, and one of factors causing irregular alignment of liquid crystal is an irregular alignment operation on an alignment film. The following description will depict the conventional alignment operation.

A liquid crystal display (LCD) device-use substrate is composed of a glass substrate, transparent electrodes provided on the glass substrate, and an alignment film which is laminated over the glass substrate so as to cover the transparent electrodes. In the process of producing such an LCD device-use substrate, a rubbing device is adopted as an alignment device. As shown in FIG. 9, such a rubbing device is provided with a rubbing roller 30 having a rotary 30a and a rubbing cloth 31. The rubbing cloth 31 is provided with innumerable piles P thereon, and is provided on the circumferential surface of the rotary roller 30a. An LCD device-use substrate is provided near the rubbing roller 30, so that the surface of the alignment film is rubbed in a specific direction by rotating the rubbing roller 30. With such an arrangement, the liquid crystal molecules are aligned in the rubbing direction. Generally, such an operation for rubbing an alignment film in a specific direction is called an alignment operation.

The rubbing cloth 31 is formed by interweaving pile material composed of filament bunches into foundation warp and weft yarns, each bunch being composed of several tens of filaments. The piles P are cut at a uniform length. Thus, the rubbing cloth 31 is arranged so that filaments densely touch the LCD device-use substrate. As shown in the figure, usually a rectangular rubbing cloth is attached to the circumferential surface of the rotary roller 30a, with the edges of the rubbing cloth 30a parallel with the edges of the rotary roller 30a's circumferential surface.

Other methods of providing a rubbing cloth around the rotary roller are disclosed in the Japanese Publication for Laid-Open Utility Model Application No. 2-33030/1990 and the Japanese Publication for Laid-Open Patent Application No. 54-40652/1979.

According to the Japanese Publication for Laid-Open Utility Model Application No. 2-33030/1990, as shown in FIG. 10, a rubbing cloth 33 in a ribbon form is spirally wound around the circumferential surface of the rotary roller 32a, so that the edges of the rubbing cloth 33 where piles P are not provided is tilted to the rotation axis of the rotary roller 32a. This was invented in the light of the following problem arising from the arrangement of the rubbing roller 30 shown in FIG. 9. Since the junction part of the rubbing clothes 31, with a width of 1 through 2 millimeters, does not have piles P, an alignment operation with use of the rubbing roller fails to align a part of the alignment film which corresponds to the junction part having no piles P. Therefore, a linear unaligned region is formed with every rotation of the rubbing roller 30.

According to the Japanese Publication for Laid-Open Patent Application No. 54-40652/1979, rubbing cloth material such as a cotton cloth or an abrasive cloth is cut out into a diamond shape. The rubbing cloth thus cut out is fixed around a circumferential surface of a rotary roller with cushion material such as sponge therebetween, so that the junction part of the rubbing cloth is tilted to the rotation axis direction of the rotary roller. This was invented so as to solve the following problem. If the rubbing cloth is rectangular, the joint part of the rubbing cloth is provided in parallel with the rotation axis direction of the rotary roller. Therefore, when the rubbing roller rotates and rubs an alignment film, it likely causes a linear unaligned portion. The above-described arrangement attempts to solve this problem by dispersing, in the oblique direction, such a defect caused by the junction part.

With the arrangement of the rubbing roller 30 shown in FIG. 9, however, the piles P unevenly touch the alignment film due to the positions of the piles P on the rubbing cloth 31. As a result, an LCD device, incorporating the LCD device-use substrate to which an alignment operation has been carried out with the rubbing device having the rubbing roller 30, tends to have irregularity in the display when the LCD device is in the ON state. To be more specific, the display has long and thin stripes running in the rubbing direction (hereinafter such irregularity caused in the display due to the uneven alignment is referred to as "irregular display with stripes"). This leads to irregularity in half tone display. Thus, this arrangement presents a problem of low quality concerning display.

The following description will discuss the cause of the problem, referring to FIG. 4 which explains the present invention. A rubbing cloth is formed by interweaving pile material composed of bunches of filaments F into foundation warp and weft yarns and cutting the piles at a uniform length, each bunch being composed of several tens of filament. The several tens of filaments F, composing one pile, flare out from the root to the end. Therefore, when the filaments F have the same length, the touch of the peripheral part of one pile P is weaker than that of the central part of the pile P. The difference between the strengths of their touches corresponds to the difference between the apparent length $L_2$ of the peripheral part of the pile P and the length $L_1$ of the central part of the pile P, namely, $L_1-L_2$.

Therefore, with the rubbing roller 30 arranged so that the rubbing cloth 31 is cut out into a rectangular shape in the same size as that of the circumferential surface of the rotary roller 30a and is fixed therearound with the edges of the rubbing cloth 31 in parallel with the edges of the circumferential surface of the rotary roller 30a, the piles P are parallel and orthogonally lined with respect to the rubbing roller 30. With this arrangement, during an alignment operation, the central parts of the piles P touch the alignment film in lines at certain intervals. As a result, the surface of the alignment film is aligned unevenly, due to the difference in the strengths of the touches of the piles P's central and peripheral parts. When an LCD device is produced through such an alignment operation, the "irregular display with stripes" due to the uneven alignment is observed when the LCD device is in the ON state, as shown in FIG. 11(a), 11(b), or 11(c).

The uneven alignment seriously affects the super twisted nematic (STN) LCD device in particular, since the display quality of the STN LCD device greatly depends on the alignment condition. When characteristics are enhanced so as to achieve high-quality display with the improvement of the quality of picture, the irregularity in the half tone display, that is, stripes irregularly appearing on the display, tends to stand out, thereby causing the yield to fall.

Note that although the Japanese Publication for Laid-Open Utility Model Application 2-33030/1990 and the Japanese Publication for Laid-Open Patent Application 54-40652/1979 disclose a method of providing the rubbing cloth around the rotary roller with a tilt, they mention nothing except simply providing them with a tilt. They mention nothing about the relation between the direction of the piles' lines on the rubbing cloth and the rotation direction of the rubbing roller. Therefore, the arrangements disclosed in the above-mentioned publications by no means solve the above-described problem.

On the other hand, the Japanese Publication for Laid-Open Patent Application 2-22624/1990 discloses still another arrangement. According to the arrangement, during a rubbing operation, the rotation axis direction is tilted at an angle falling in the range of ±1° through ±45° to the orthogonal direction of the moving direction of the LCD device-use substrate. When the end of each pile on the rubbing cloth is split, it tends to cause irregular alignment, which results in comparatively strongly aligned linear portions and comparatively weakly aligned linear portions, and the described arrangement intends to prevent such a phenomenon. However, in this case, since the rotation direction of the rubbing roller 34 and the moving direction of the LCD device-use substrate 35 differ, the surface of the alignment film is curvedly rubbed as shown in FIG. 12(a), thereby causing an inconvenience that the twist angles of the liquid crystal slightly vary. Note that when the rubbing roller 34 rotates in the moving direction of the LCD device-use substrate 35 as shown in the FIG. 12(b), the rubbing is carried out straight in the moving direction, and the twist angles of the liquid crystal are not adversely affected.

SUMMARY OF THE INVENTION

The object of the present invention is to restrain "irregular display with stripes" which occurs to an LCD device due to the following cause: piles provided on a rubbing cloth which is provided around a rubbing roller unevenly touch an alignment film due to the positions of the piles.

To achieve the above object, an alignment device of the present invention comprises a rubbing roller composed of a rotary roller and a rubbing cloth. The rubbing cloth, provided on a circumferential surface of the rotary roller, is provided with piles. The alignment device carries out alignment with respect to an alignment film provided on a liquid crystal display device-use substrate in accordance with rubbing of the piles against the alignment film during each rotation of the rubbing roller so that the alignment film is aligned in a specific direction. The piles are provided on the rubbing cloth at cyclic intervals in two directions orthogonal to each other, and the rubbing cloth is provided so that one of the directions of the piles is tilted to a rotation direction of the rubbing roller.

According to the described arrangement, one of the directions of the pile lines is tilted to the rotation direction of the rubbing roller. Therefore, during a rubbing operation of the alignment film, the positions where the root parts of the piles fall on deviate toward the rotation axis direction of the rubbing roller, with rotation of the rubbing roller. On the other hand, as to the conventional arrangement, one of the directions of the pile lines is parallel to the rotation direction of the rubbing roller. Therefore, portions of the alignment film touched by the central parts of the piles are formed in stripes at intervals corresponding to the intervals of the pile lines, with the touched parts strongly aligned and the others weakly aligned. In contrast, with the arrangement of the present invention, parts touched by the central parts of the piles are dispersed in the rotation axis direction, resulting in that the intensity of the rubbing operation per a unit space on the surface of the alignment film is evened. Thus, a more even rubbing operation is achieved. In other words, an uneven alignment due to the positions of piles is prevented, and an even and thorough rubbing operation to the alignment film is achieved. In this case, there is no need to differ the rotation direction of the rubbing roller from the moving direction of the LCD device-use substrate. Therefore, there is no fear that twist angles of liquid crystal would be varied. Consequently, an LCD device incorporating an LCD device-use substrate to which an alignment operation has been carried out by the alignment device of the present invention has less irregularity in the display, and has superior display quality when carrying out the half tone display.

The above-mentioned rubbing roller can be realized, for example, by cutting a rubbing cloth out of a rubbing cloth material so that the rubbing cloth is cut out on the tilt to the foundation yarn of the rubbing cloth material and providing it parallel around the rotary roller. Alternatively, it is also realized by providing a rubbing cloth around the rotary roller with a tilt, the rubbing cloth having been cut out of the rubbing cloth material so that the rubbing cloth is cut out in parallel to the foundation yarn.

Concerning the described arrangement, it is preferable that the tilt angle of one of the directions of the pile lines to the rotation direction of the rubbing roller falls in the range of not less than 0.5° and not more than 5°. More specifically, a tilt angle smaller than 0.5° is not practical in the light of the accuracy in cutting the rubbing cloth out of the rubbing cloth material, or in the light of the accuracy in winding the rubbing cloth around the rotary roller. On the other hand, given a tilt angle greater than 5°, a deviation of the pile root positions toward the rotation axis direction, which is caused by tilting one of the pile line directions with respect to the rotation direction, becomes too greater, thereby resulting in that it is difficult to determine a tilt angle so that the central parts of the piles may not intensively touch any line on the alignment film, that is, so that two pile root parts may not fall on the same lines. In the case of a tilt angle greater than 5°, even a small variation in the tilt angle more likely causes two pile root parts to fall on the same line on the alignment film. Thus, by setting the tilt angle in the range of not less than 0.5° and not more than 5° as described above, an uneven alignment due to the positions of the piles can be effectually prevented.

Furthermore, concerning the above-mentioned arrangement, it is preferable that the rubbing roller is provided so that its rotation axis is perpendicular to the moving direction of the LCD device-use substrate, and a width direction of the LCD device-use substrate is transported under the rubbing roller by substrate transportation means in a manner such that the LCD device-use substrate is tilted at a predetermined angle to the moving direction of the same.

The arrangement of the present invention is effectual, in particular when the arrangement is adopted to a device wherein the rotation direction of the rubbing roller and the moving direction of the LCD device-use substrate are the same, since such a device tends to cause uneven alignment with strongly aligned portions and weakly aligned portions in a stripe form. By adopting the arrangement of the present invention, such uneven alignment can be effectively prevented.

More preferably, concerning the foregoing arrangement, the tilt angle of the pile lines, the intervals of the piles on the rubbing cloth, a peripheral velocity of the rubbing roller, and a moving velocity of the LCD device-use substrate are determined so that central parts of the piles of the rubbing cloth touch, less than 20 times, a line with a length of 1 mm on an alignment film in the same direction as a moving direction of the LCD device-use substrate.

The applicant of the present invention has found, from many experiments, that "irregular display with stripes" occurs to some extent when the central parts of the piles touch, not less than 20 times, a line with a length of 1 millimeter on the alignment film in the same direction as the moving direction of the LCD device-use substrate, while "irregular display with stripes" does not occur at all when the central parts of the piles touch the line less than 20 times. Therefore, since, according to the foregoing arrangement, the tilt angle of the pile lines, the intervals of the piles on the rubbing cloth, a peripheral velocity of the rubbing roller, and a moving velocity of the LCD device-use substrate are determined so that the touches are less than 20, the prevention of "irregular display with stripes" is ensured. As a result, an LCD device incorporating LCD device-use substrates to which the alignment operation has been carried out by the alignment device of the present invention has no "irregular display with stripes" and has superior display quality, when carrying out the half tone display.

In order to achieve the above-mentioned object, the rubbing cloth of the present invention, provided on a circumferential surface of a rotary roller so as to compose a rubbing roller, comprises piles thereon. The piles are provided at cyclic intervals in two directions orthogonal to each other, so that one of the directions of the piles is tilted to a rotation direction of the rubbing roller.

According to the described arrangement, the piles have already been arranged so that one of the directions of the pile lines is tilted to the rotation direction of the rubbing roller when the rubbing roller is made up by providing the rubbing cloth around the rotary roller. Therefore, with use of such a rubbing cloth, the alignment device can be realized by providing the rubbing cloth around the circumferential surface with the edges of the rubbing cloth parallel to the edges of the circumferential surface, as is the case with the conventional manner, and it is not required to tilt the rubbing cloth. In this case, the accuracy in realizing the tilt of the pile lines is enhanced, compared with the arrangement wherein the tilt is achieved by tilting the rubbing cloth.

Concerning the above described arrangement, it is preferable that the piles are provided so that one of the directions of the pile lines is tilted to the rotation direction of the rubbing roller at an angle falling in the range of not less than 0.5° and not more than 5°.

According to this arrangement, the tilt of the piles' lines has been already arranged so that one of the directions of the pile lines is tilted to the rotation direction of the rubbing roller at an angle falling in the range of not less than 0.5° and not more than 5° when the cloth is provided around the rotary roller. Therefore, with use of such a rubbing cloth, the alignment device of the present invention, wherein one of the directions of the piles is tilted at an angle of not less than 0.5° and not more than 5°, can be realized by providing the rubbing cloth around the circumferential surface with the edges of the rubbing cloth parallel to the edges of the circumferential surface, as is the case with the conventional manner, and it is not required to tilt the rubbing cloth. If it is attempted to achieve such a small tilt angle falling in the range of not less than 0.5° and not more than 5° by tilting the rubbing cloth, it is difficult to achieve it accurately, due to a deviation which likely occurs when providing the cloth. In contrast, with the foregoing arrangement, a tilt angle is easily achieved only by providing the cloth parallel. Thus, the arrangement of the present invention can be realized with remarkable ease, compared with the arrangement wherein the tilt is achieved by providing the rubbing cloth with the tilt.

Furthermore, in order to achieve the above-described object, a method for manufacturing an LCD device of the present invention is composed of the following steps: (1) transporting a liquid crystal display device-use substrate under a rotated rubbing roller, the liquid crystal display device-use substrate having an alignment film thereon, the rubbing roller being composed of a rotary roller and a rubbing cloth, the rubbing cloth being provided on the circumferential surface of the rotary roller and being provided with piles, the piles being provided at cyclic intervals in two directions orthogonal to each other, one of the two directions of the piles being tilted to a rotation direction of the rubbing roller, so that alignment is carried out with respect to the alignment film in a specific direction in accordance with rubbing of the piles against the alignment film during each rotation of the rubbing roller; (2) a second step of binding a pair of substrates to each other, at least one of the pair of substrates having gone through the alignment in the first step; and (3) a third step of injecting liquid crystal between the substrates.

When the LCD device-use substrate has gone through an alignment operation by the above method, it has a uniformly rubbed alignment film, because the method permits the rubbing intensity to be evened for any lines on the alignment film. Therefore, an LCD device incorporating such an LCD device-use substrate has superior display quality even when carrying out the half tone display, without causing "irregular display with stripes".

It is preferable that the foregoing LCD device is a super twisted nematic (STN) LCD device. Usually, an STN LCD device greatly depends on the alignment conditions, and is easily affected by "irregular display with stripes". The above manufacturing method, however, allows the STN LCD device to have superior quality when carrying out the half tone display. Therefore, the method is particularly effective with the STN LCD device.

For a fuller understanding of the nature and advantages of the invention, reference should be made to the ensuing detailed description taken in conjunction with the accompanying drawings.

BRIEF DESCRIPTION OF THE DRAWINGS

FIG. 12(a) is a view illustrating the condition of the alignment film when the rotation of the rubbing roller and the moving of the LCD device-use substrate have different directions, while FIG. 12(b) is a view illustrating the condition of the alignment film when the rotation of the rubbing roller and the moving of the LCD device-use substrate have the same direction.

DESCRIPTION OF THE PREFERRED EMBODIMENTS

The following description will discuss an embodiment of the present invention with reference to FIGS. 1 through 6. Note that this embodiment deals with a case where an alignment device of the present invention is employed in the production process of an STN liquid crystal display device with a phase difference plate.

Figure 2:
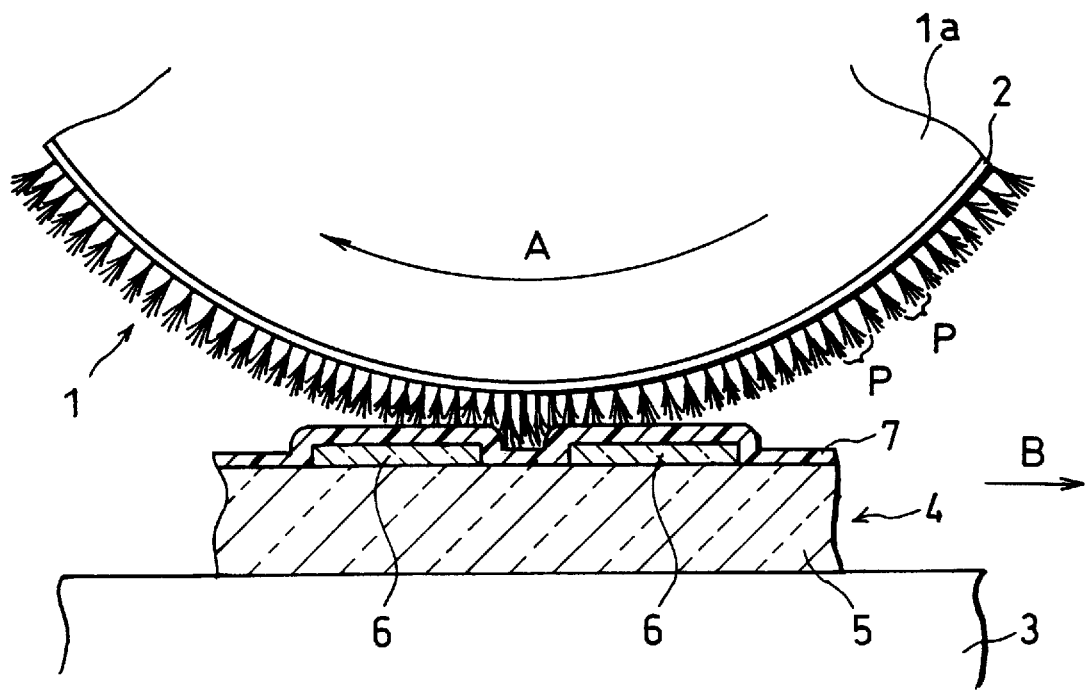
FIG. 2 is a view illustrating a method of rubbing the surface of an alignment film during an alignment operation.

A rubbing device as the alignment device in accordance with the present embodiment is provided with a rubbing roller 1 and a movable stage (substrate transportation means) 3, as shown in FIG. 2. The rubbing roller 1 is rotated in a direction indicated by an arrow A. The movable stage 3 is provided below the rubbing roller 1, vis-a-vis the circumferential surface of the rubbing roller 1.

Figure 1A:
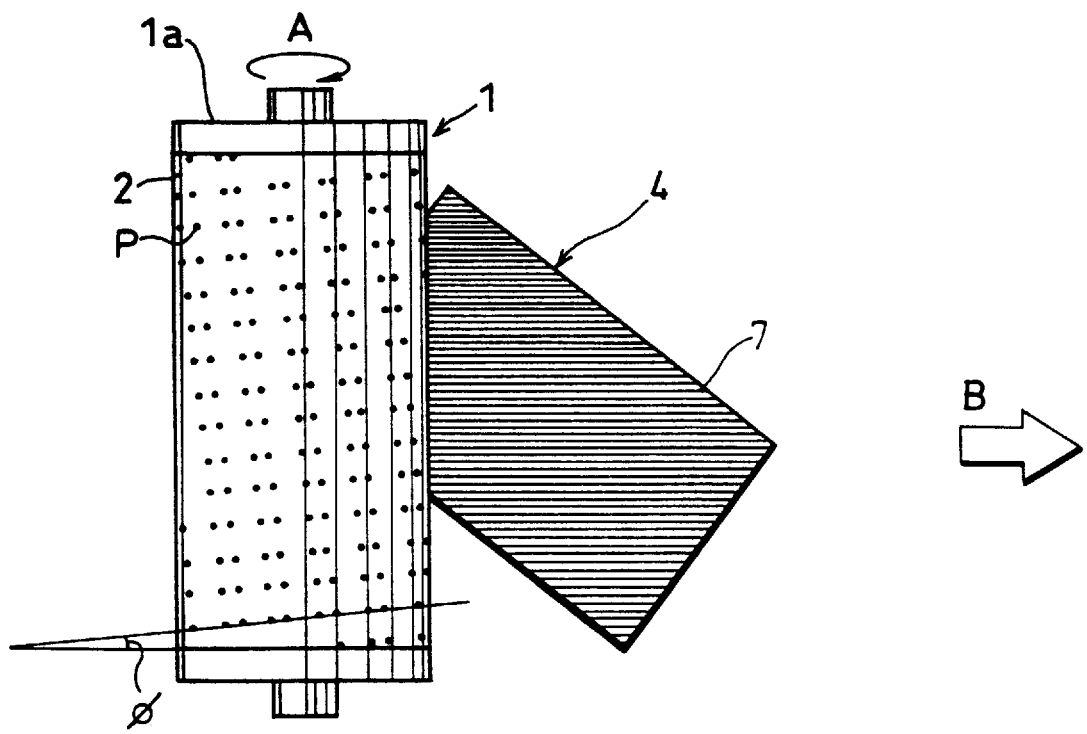
FIG. 1(a) is a view illustrating an alignment device in accordance with one embodiment of the present invention.

The movable stage 3 carries a liquid crystal display (LCD) device-use substrate 4, and horizontally moves it in a direction indicated by an arrow B. Here, the LCD device-use substrate 4 is placed on the movable stage 3 so that its width direction is tilted at a predetermined angle to the direction of the arrow B, as shown in FIG. 1(a). The LCD device-use substrate 4 is composed of (1) a transparent substrate 5 made of glass, (2) transparent electrodes 6, and (3) an alignment film 7. The alignment film 7 is laminated over the surface of the transparent substrate 5 on which the transparent electrodes 6 are disposed.

The rubbing roller 1 is fixed so that its rotation axis is orthogonal to the moving direction of the movable stage 3. The rubbing roller 1 is composed of a rotary roller 1a (roller main body) and a rubbing cloth 2 provided around a circumferential surface of the rotary roller 1a. The rubbing cloth 2 is provided with innumerable piles P.

Figure 3:
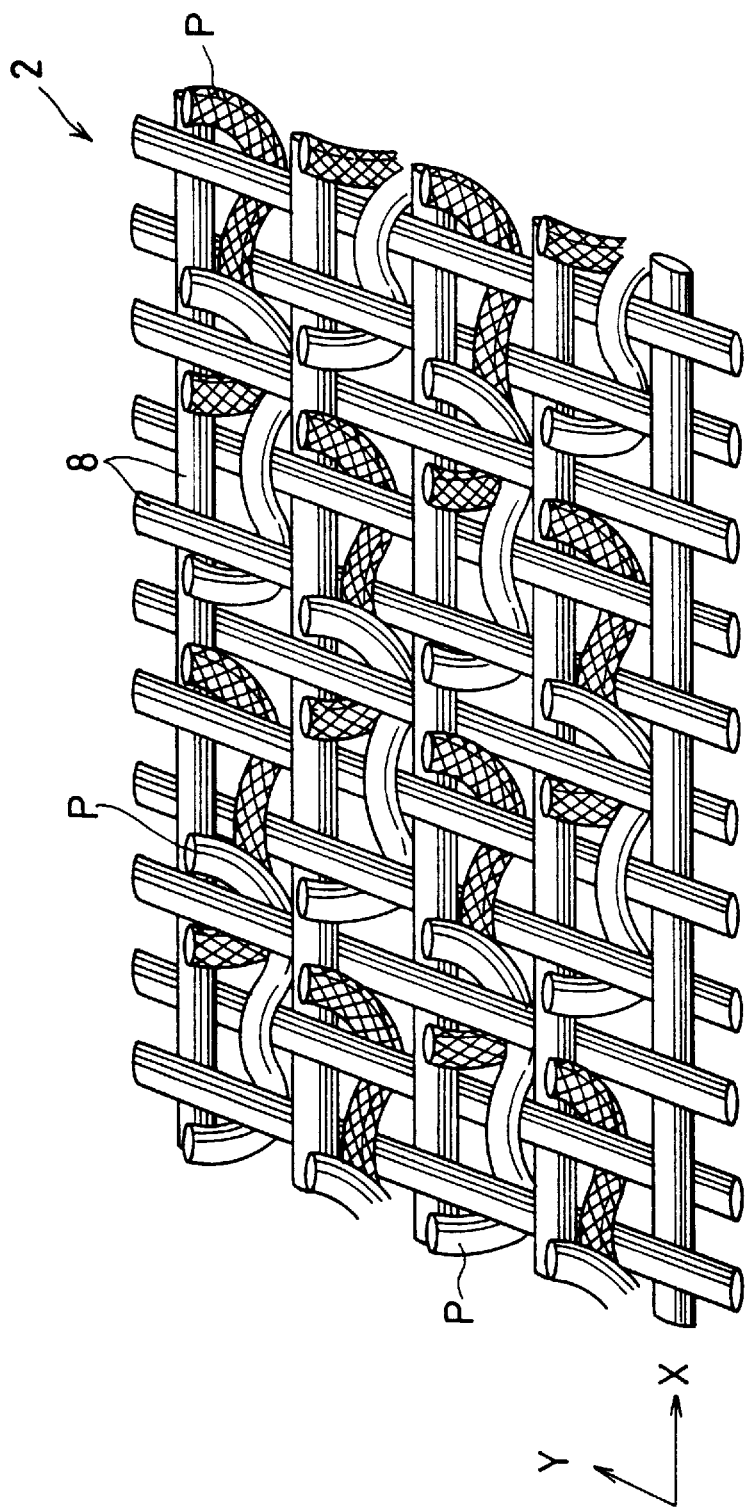
FIG. 3 is a view illustrating how piles are provided in foundation yarns of a rubbing cloth.
Figure 4:
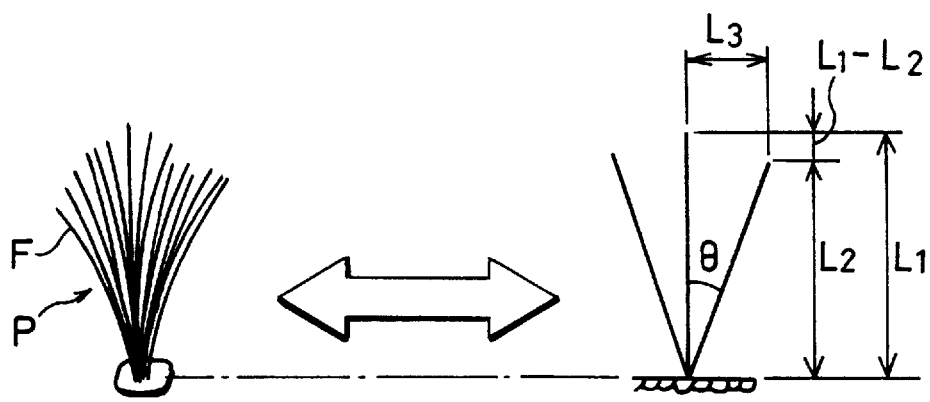
FIG. 4 is a view illustrating one of the piles which are provided in the rubbing cloth.

As to the rubbing cloths 2, as shown in FIG. 3, the piles P are provided at cyclic intervals in the foundation yarns 8, which are woven in the X and Y directions orthogonal to each other. The piles P, each of which is a bunch of several tens of filaments, have the same length. As shown in FIG. 4, each of the bunches of filaments F composing the piles P flares out from the root to the end.

As shown in FIG. 1(a), the piles P are planted in the rubbing cloth 2, so that one of the directions of the pile lines is tilted at an angle (tilt angle) φ to the rotation direction (orthogonal to the rotation axis) of the rubbing roller 1 when the rubbing cloth 2 is provided around the rotary roller 1a. Note that in FIG. 1(a) and other figures which are plan views of the rubbing cloth, the piles P are represented as closed circles ● which indicate only roots of the same.

Figure 5:
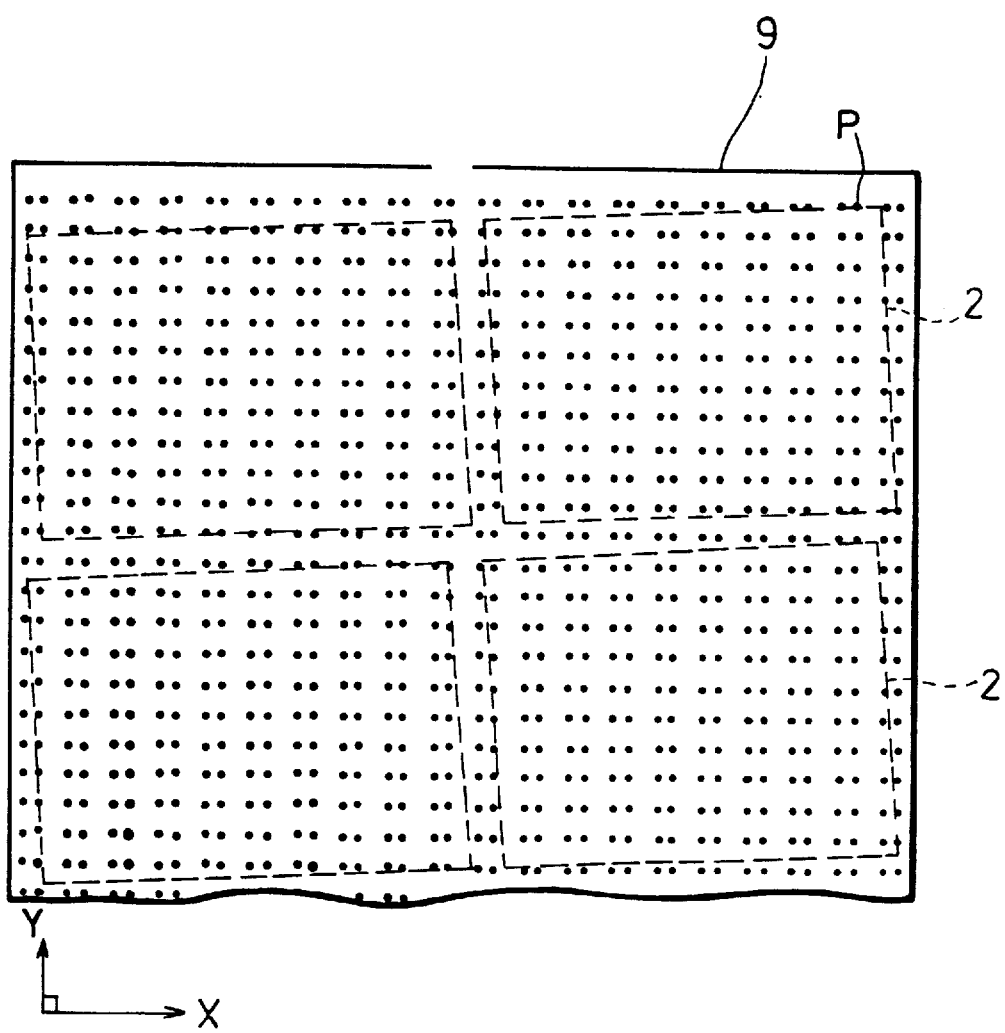
FIG. 5 is a view illustrating how the rubbing clothes are cut out of rubbing cloth material.

In order to form such a rubbing roller 1, as shown in FIG. 5, the rubbing cloth 2 is cut out from a rubbing cloth material 9 in accordance with the size of the circumferential surface of the rotary roller 1a, so that one of the directions of the piles P is tilted at the angle φ when the rubbing cloth 2 is provided around the rotary roller 1a. The rubbing cloth 2 is provided around the circumferential surface of the rotary roller 1a, so that the edges of the rubbing cloth 2 are parallel to the edges of the circumferential surface of the rotary roller 1a. This method has an advantage that an accurate tilt angle is achieved simply by providing the rubbing cloth 2 around the rotary roller 1a so that the edges of the rubbing cloth 2 is parallel to the edges of the circumferential surface of the rotary roller 1a, as is conventionally done.

Note that the same effect as above is achieved by cutting out the rubbing cloth from the rubbing cloth material into a rectangular shape parallel with the yarn of the rubbing cloth material and providing them around the rotary roller 1a so that one of the pile line directions is tilted at an angle φ. This method has an advantage that the rubbing roller 1 can be produced with already-existing parts, since rubbing cloths already produced are utilized.

The tilt angle φ is preferably not less than 0.5° and not more than 5°, for the following reason. Given a tilt angle of less than 0.5°, it is difficult to accurately achieve such a small tilt in both the cases of the alignment device of the present embodiment, that is, in the case where a tilt is given when the rubbing cloth 2 is cut out and thereafter the cloth is provided around the rotary roller 1a, and in the case where a tilt is given when the rubbing cloth cut out in a usual manner is fixed around the rotary roller 1a, respectively. Therefore, it is not practical. On the other hand, given a tilt angle of more than 5°, the positions where the roots of the piles P fall on deviate more greatly in the rotation-axis direction during rotations, the deviation being caused by tilting the direction of the piles P to the rotation direction. Therefore, it is difficult to set a tilt angle so that many of piles P's central parts, i.e., root parts of the piles P, do not intensively fall on specific lines on the alignment film 7. In addition, there is more likelihood that even a minute change in such a tilt angle may cause roots of the piles P to fall on specific lines on the alignment film 7.

Concerning a rubbing cloth on which piles P are provided at an interval of a from several-tens µm to several-hundreds µm order, it is particularly preferable that the tilt angle is not more than 1°. This arrangement ensures that the pile P's central parts uniformly fall on a unit area of the alignment film 7, thereby resulting in that the alignment film 7 is more thoroughly rubbed.

With a rubbing device arranged as above, an alignment operation is carried out by rubbing the alignment film 7 on the LCD device-use substrate 4 in the following manner. The LCD device-use substrate 4 is diagonally fixed on the movable stage 3, with the side of the alignment film 7 upward. The rubbing roller 1 is rotated while the movable stage 3 is moved, so that the LCD device-use substrate 4 passes below the rubbing roller 1. During this operation, the alignment film 7 formed on the surface of the LCD device-use substrate 4 is rubbed in a specific direction by the innumerable piles P provided on the circumferential surface of the rubbing roller 1.

Incidentally, as described above, since each of the piles P of the rubbing cloth 2 flares out from the root to the end, the central part and the peripheral part of each pile P have different strengths of touch. To be more specific with reference to FIG. 4, when a length of the filaments F composing the piles P and an angle at which a filament F in the periphery flares out are given as $L_1$ and $\theta$ respectively, a length of the central part of the filament F is given as $L_1$, while an apparent length $L_2$ of the peripheral part of the filament F is given as:

$$L_2 = L_1 \cos \theta$$

Thus, when the piles P touch the alignment film 7, a difference in the strengths of touches, which corresponds to the difference $L_1 - L_2$ between the lengths, occurs between the central part and the peripheral part of each pile P.

Therefore, when the rubbing cloth 2 is provided around the rotary roller 1a so that one of the directions of the piles P is parallel to the rotation direction, the positions where the roots of the piles P fall on have no deviation in the rotation axis direction during the rotation of the rubbing roller 1. As a result, the central parts of the piles P fall on parallel straight lines on the alignment film 7, whose intervals correspond to the intervals of the piles P. Therefore, the alignment film 7 would be rubbed unevenly, consequently causing "irregular display with stripes" to an LCD device incorporating such a rubbing device.

Figure 6:
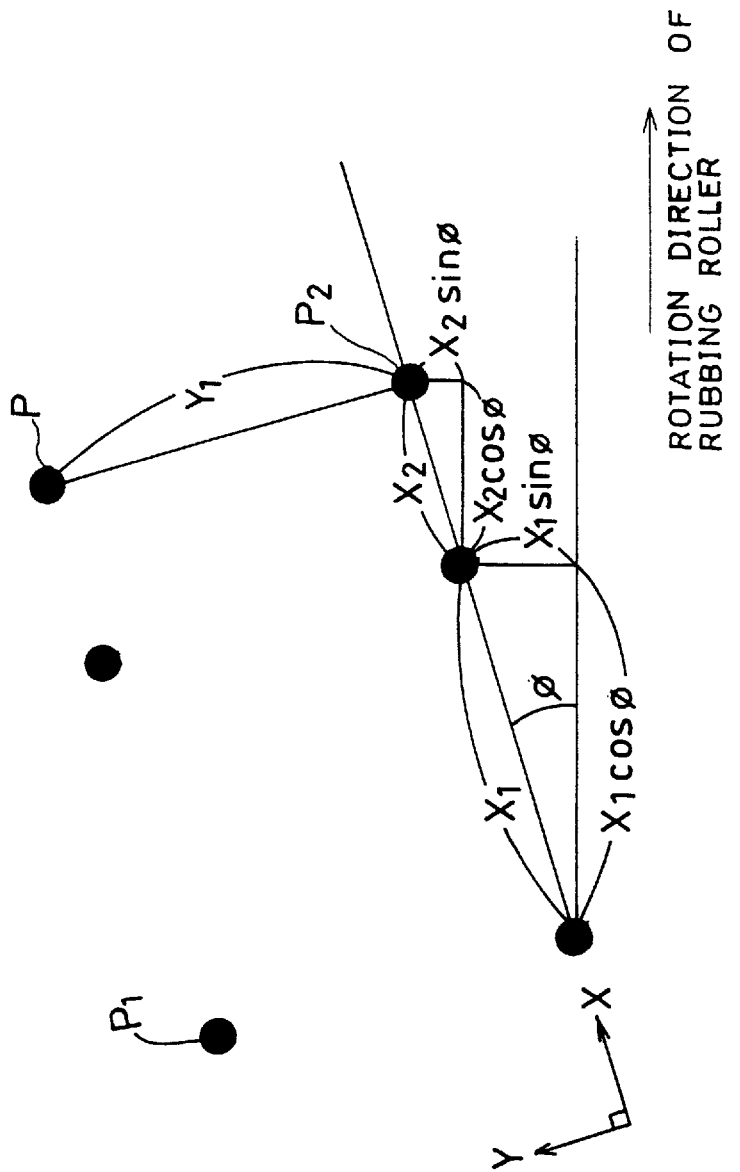
FIG. 6 is a view illustrating how the positions which the root parts of the piles fall on deviate, when one of the directions of the pile lines is tilted at an angle φ to the rotation direction of the rubbing roller.

In contrast, in the rubbing device of the present embodiment, one of the directions of the piles P is tilted at an angle $\theta$ to the rotation direction of the rubbing roller 1, as described above. Therefore, as shown in FIG. 6, when the piles P are provided at intervals $X_1$ and $X_2$ in the X direction and at an interval Y1 in the Y direction, the positions on which the root parts of the piles P fall deviate in the rubbing roller 1's rotation-axis direction by $X_1 \sin \phi$ and $X_2 \sin \phi$, with rotation of the rubbing roller 1 by $X_1 \cos \phi$ and $X_2 \cos \phi$ of the circumferential surface, respectively.

Figure 1B:
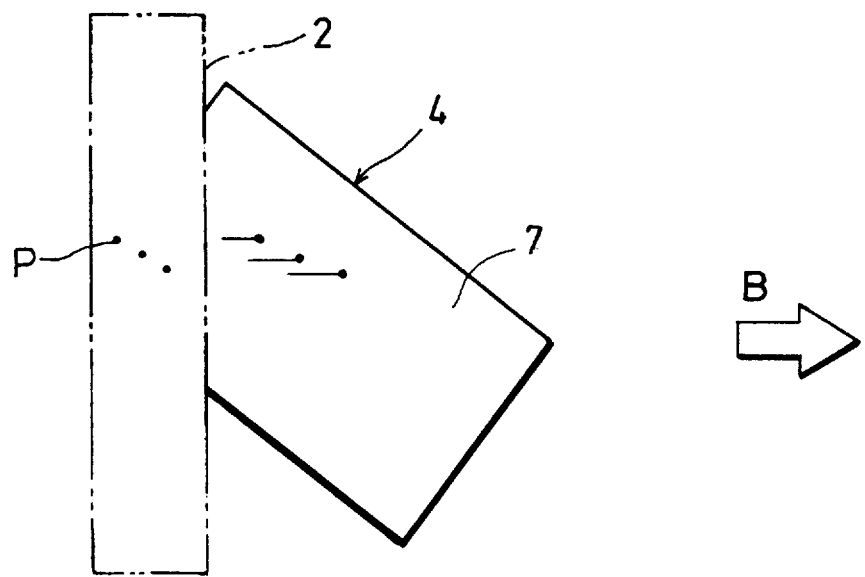
FIG. 1(b) is a view illustrating how an alignment operation is carried out by the alignment device.

Therefore, as is clear from FIG. 1(b) illustrating the concept of the alignment operation, differences in the strength of touches of the piles P are cancelled, and the alignment film 7 is evenly rubbed.

As a result, "irregular display with stripes" is effectively prevented in an STN liquid crystal display device which is produced by sticking two LCD device-use substrates 4 each other to which an alignment operation has been carried out using the rubbing device of the present embodiment, and injecting liquid crystal therebetween. Such an STN LCD device has preferable display characteristics, when carrying out the half tone display as well.

The following description will discuss examples of the rubbing device in accordance with the embodiment of the present invention, referring to FIGS. 1, 3, 4, 6, and 7 which have also been referred to in the foregoing description.

[FIRST EXAMPLE]

The following description will discuss an example of the rubbing device of the present invention with reference to FIGS. 1, 3, and 4 which have also been referred to in the foregoing description.

As shown in FIG. 1(a), 'YA-18-R' produced by Asahi Chemical Industry Co., Ltd. was employed as material of a rubbing cloth 2 of a rubbing roller 1 provided in a first rubbing device of the present embodiment. Each of piles P on 'YA-18-R' was composed of 40 filaments. The piles P were provided, as shown in FIG. 3, at intervals of 414 µm and 207 µm in the X direction, and at an interval of 374 µm in the Y direction. Each of the filaments composing the piles P had a length $L_1$ of 1,600 µm. As shown in FIG. 4, each pile P of the rubbing cloth 2 flared out from the root to the end, with a width $L_3$ of 500 µm at the end. Therefore, when each pile P touched an alignment film 7 of an LCD device-use substrate 4, a filament F in the central part of each pile P had the length $L_1$ of 1,600 µm, whereas a filament F in the peripheral part of each pile P had an apparent length $L_2$ which was obtained as follows:

$$L_2 = L \cos \theta \approx 1580 \ \mu m$$

$$(\theta = \sin^{-1} (L_3/L_1) \approx 8.9°)$$

Accordingly, a difference occurred between the strengths of touch the central and peripheral parts of each pile P, which corresponded to the difference between $L_1$ and $L_2$, namely 20 µm,.

In order to form rubbing cloth 2 for use in the first rubbing device, rubbing cloth 2 was cut out of the above-mentioned rubbing cloth material 'YA-18-R' into a shape in accordance with the shape of the circumferential surface of a rotary roller 1a, so that the X direction of the piles P's lines was tilted at an angle of 1° (=$\phi$) when the rubbing cloth 2 was provided around the rotary roller 1a. The rubbing cloth 2 was fixed on the circumferential surface of the rotary roller 1a, so that the edges of the rubbing cloth 2 were parallel with the edges of the circumferential surface of the rotary roller 1a.

Accordingly, as shown in FIG. 1(a), the X direction of the piles P was tilted at an angle of 1° (=$\phi$) to the rotation direction of the rubbing roller 1.

Using the first rubbing device arranged as above, an alignment operation was carried out to the alignment film 7 formed on the LCD device-use substrate 4, under the following rubbing conditions. FIG. 1(b) illustrates the concept of this operation.

<Rubbing Conditions>
  rotation of rubbing roller: 800 rpm
  diameter of rubbing roller: 150 mmΦ
  moving velocity of substrate: 80 mm/sec
(Under the described conditions, with a move of the LCD device-use substrate 4 by 1 mm, a dot on the circumferential surface of the rubbing roller 1 moved by 78.5 mm in the rotation direction.)

Thereafter, two LCD device-use substrates 4 to which the alignment operation had been already carried out were stuck to each other, and liquid crystal was injected therebetween. Using an STN LCD device thus produced, it was checked whether "irregular display with stripes" occurred. No "irregular display with stripes" was observed.

[SECOND EXAMPLE]

The following description will discuss another example of the rubbing device of the present invention, referring to FIGS. 1 and 5.

A second rubbing device was arranged as shown in FIG. 1(a). As to the first rubbing device mentioned above, the X direction of the piles P was tilted at an angle 1° (=φ) to the rotation direction of the rubbing roller 1. On the other hand, as to the second rubbing device, the X direction was tilted at an angle 5° (=φ). This was the only difference between the first and second rubbing devices.

In order to produce the rubbing roller 1 provided in the second rubbing device arranged as above, rubbing cloth 2 was cut out of the rubbing cloth material 'YA-18-R' into a shape in accordance with the shape of the circumferential surface of a rotary roller 1a, so that the X direction of the piles P was tilted at an angle of 5° (=φ) when the rubbing cloth 2 was provided around the rotary roller 1a. The rubbing cloth 2 was fixed on the circumferential surface of the rotary roller 1a, so that the edges of the rubbing cloth 2 were parallel to the edges of the circumferential surface of the rotary roller 1a.

Using the second rubbing device arranged as above, an alignment operation was carried out to an alignment film 7 formed on an LCD device-use substrate 4, under the same rubbing conditions as those for the first rubbing device. FIG. 1(b) illustrates the concept of this operation.

Thereafter, two LCD device-use substrates 4 to which the alignment operation had been already carried out were stuck to each other, and liquid crystal was injected therebetween. Using an STN LCD device thus produced, it was checked whether "irregular display with stripes" occurred. No "irregular display with stripes" was observed.

[THIRD EXAMPLE]

The following description will discuss another example of the rubbing device of the present invention, referring to FIGS. 7 and 5.

Figure 7A:
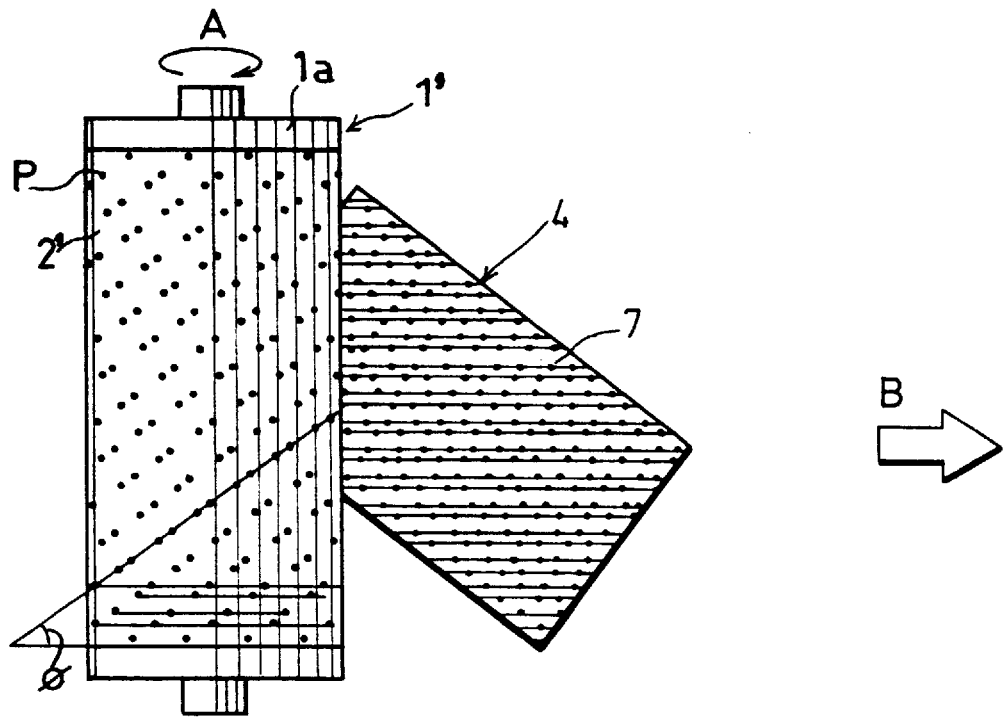
FIG. 7(a) is a view illustrating another alignment device in accordance with the embodiment of the present invention.

A third rubbing device of the present invention was arranged as shown in FIG. 7(a). As to the first rubbing device described above, the X direction of the piles P was tilted at an angle 1° (=φ) to the rotation direction of the rubbing roller 1. On the other hand, as to the third rubbing device, the X direction of the piles P was tilted at an angle 30° (=φ) to the rotation direction of a rubbing roller 1'. This was the only difference between the first and third rubbing devices.

In order to produce the rubbing roller 1' provided in the third rubbing device arranged as above, rubbing cloth 2' was cut out of the rubbing cloth material 'YA-18-R' into a shape in accordance with the shape of the circumferential surface of a rotary roller 1a, so that the X direction of the piles P was tilted at an angle of 30° (=φ) when the rubbing cloth 2' was provided around the rotary roller 1a. The rubbing cloth 2' was fixed on the circumferential surface of the rotary roller 1a, so that the edges of the rubbing cloth 2' were parallel with the edges of the circumferential surface of the rotary roller 1a.

Figure 7B:
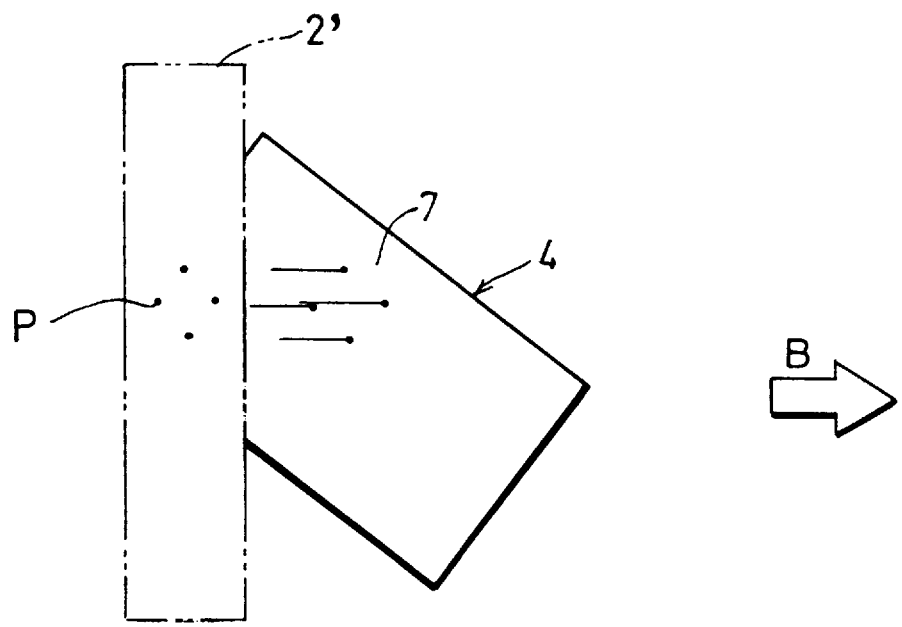
FIG. 7(b) is a view illustrating how an alignment operation is carried out by the alignment device.

Using the third rubbing device arranged as above, an alignment operation was carried out to an alignment film 7 formed on an LCD device-use substrate 4, under the same rubbing conditions as those for the first rubbing device. FIG. 7(b) illustrates the concept of this operation.

Thereafter, two LCD device-use substrates 4 to which the alignment operation had been already carried out were stuck to each other, and liquid crystal was injected therebetween. Using an STN LCD device thus produced, it was checked whether "irregular display with stripes" occurred. "irregular display with stripes" was observed, but its rate was less than the rate of "irregular display with stripes" occurring to an LCD device to which an alignment operation had been carried out by a conventional alignment device.

[COMPARATIVE EXAMPLE]

The following description will discuss a comparative example to the present invention, referring to FIGS. 8 and 5.

Figure 8A:
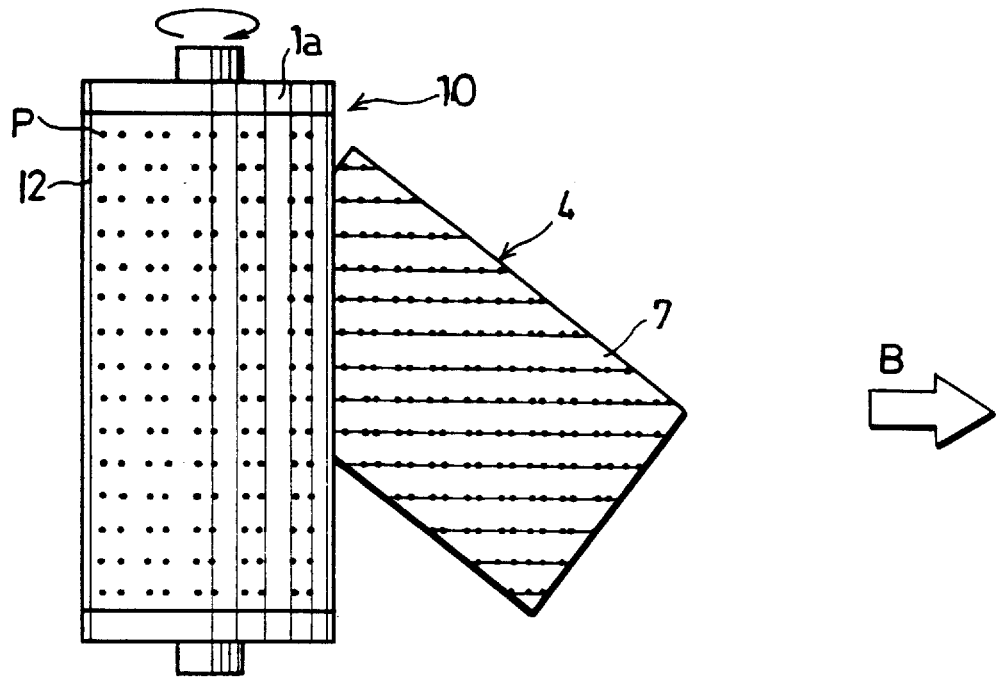
FIG. 8(a) is a view illustrating an alignment device as a comparative example.

FIG. 8(a) illustrates a rubbing device for comparison. As to the first rubbing device of the present invention, the X direction of the piles P on the rubbing roller 1 was tilted at an angle 1° (=φ) to the rotation direction of the rubbing roller 1. On the other hand, as to the comparative rubbing device, the X direction was not tilted to a rubbing roller 10. This was the only difference between these two rubbing devices.

In order to produce the rubbing roller 10 provided in the comparative rubbing device arranged as above, rubbing cloth 12 was cut out of the rubbing cloth material 'YA-18-R' into a shape in accordance with the shape of the circumferential surface of a rotary roller 1a, so that the edges of the rubbing cloth 12 were parallel with the foundation yarn 8 (see FIG. 3). The rubbing cloth 12 were fixed on the circumferential surface of the rotary roller 1a, so that the edges of the rubbing cloth 12 were parallel with the edges of the circumferential surface of the rotary roller 1a.

Figure 8B:
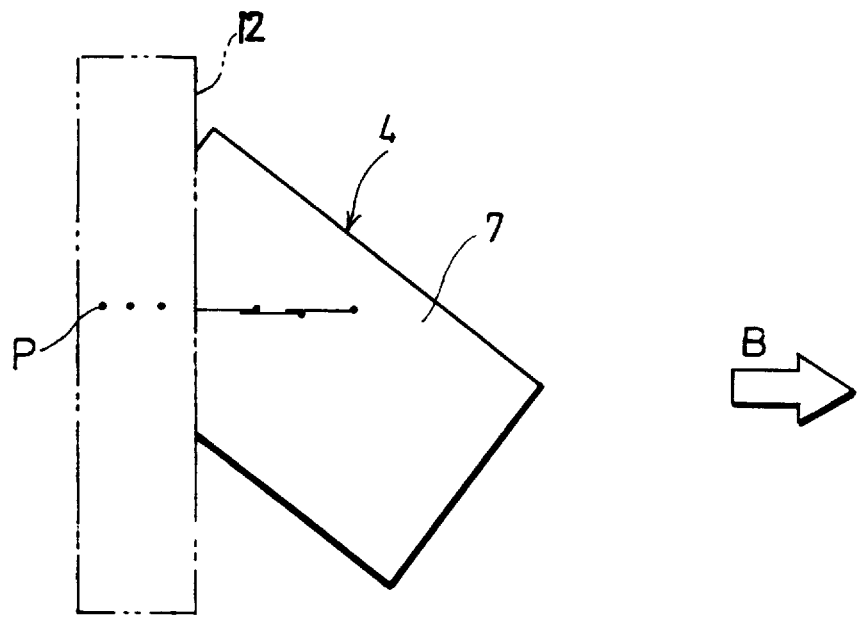
FIG. 8(b) is a view illustrating how the alignment device carries out an alignment operation.
Figure 9:
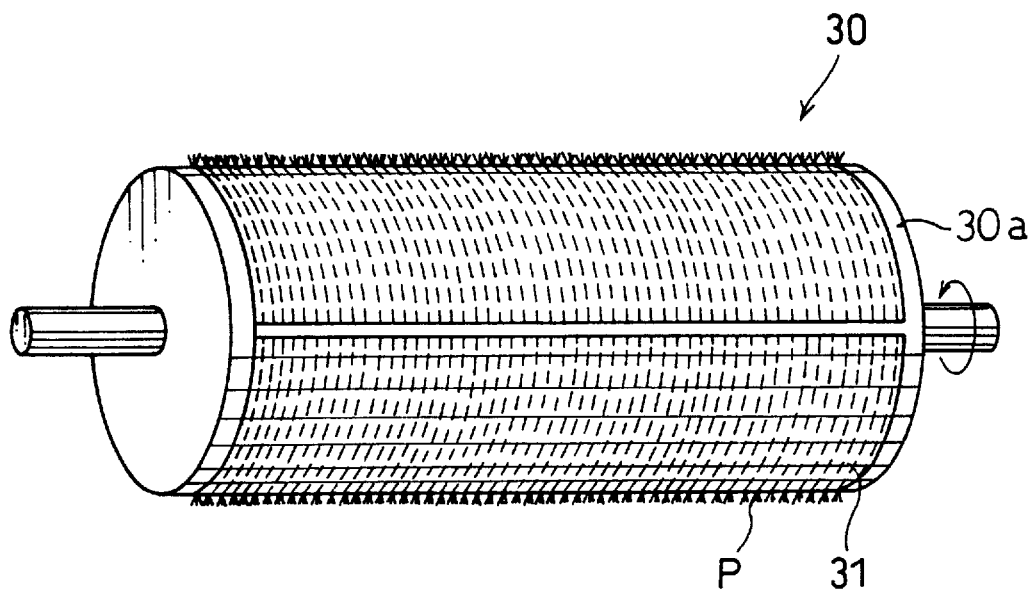
FIG. 9 is a view illustrating a rubbing roller of a conventional alignment device.
Figure 10:
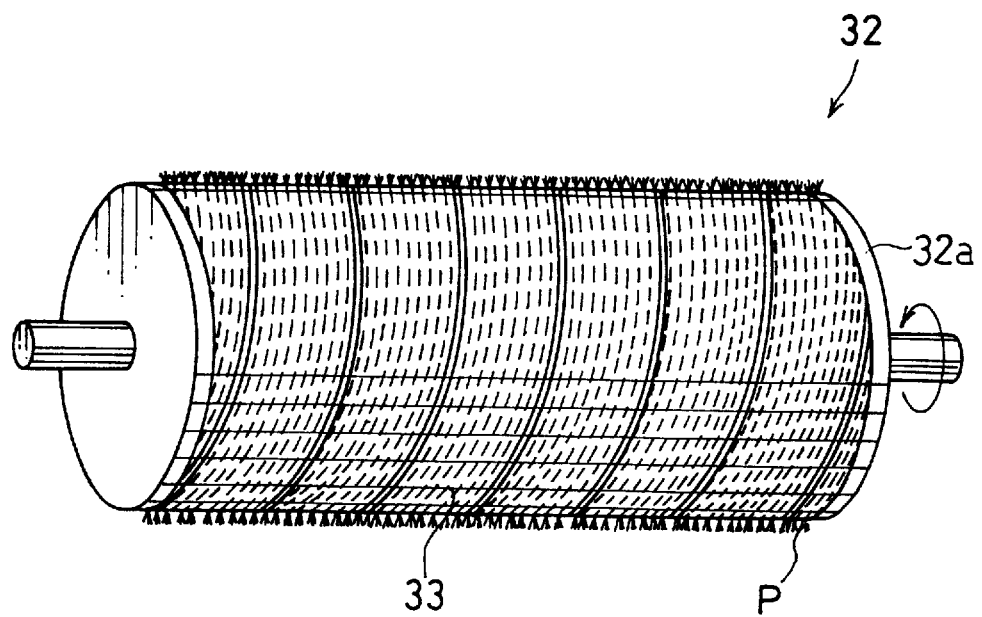
FIG. 10 is a view illustrating a rubbing roller of a conventional alignment device.
Figure 11A:
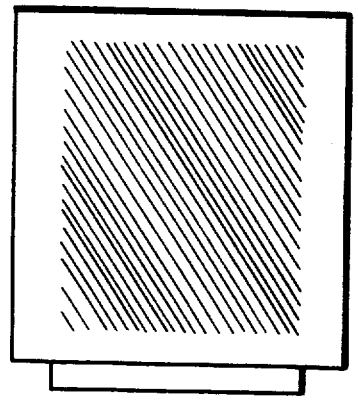
FIGS. 11(a), 11(b) and 11(c) are views illustrating screen conditions when "irregular display with stripes" occurs.
Figure 11B:
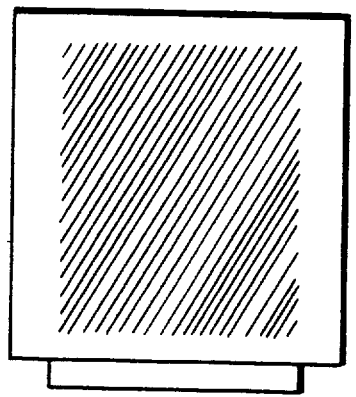
Figure 11C:
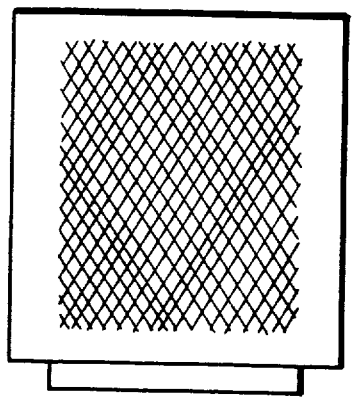
Figure 12A:
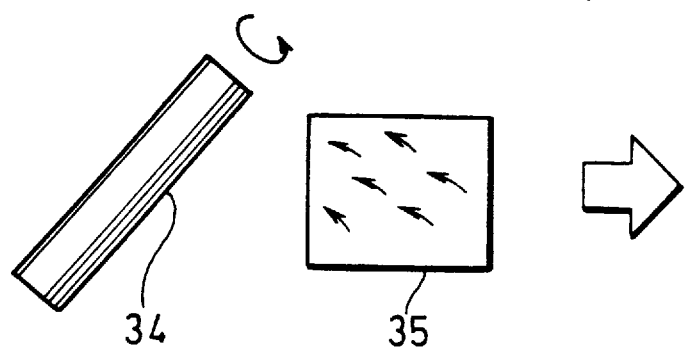
FIGS. 12(a) and 12(b) are views illustrating how conditions of an alignment film differ depending on the relations between the rotation direction of a rubbing roller and the moving direction of an LCD device-use substrate.
Figure 12B:
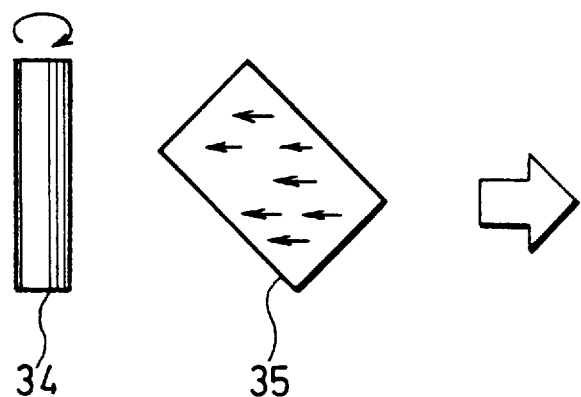

Using the comparative rubbing device arranged as above, an alignment operation was carried out to an alignment film 7 formed on an LCD device-use substrate 4, under the same rubbing conditions as those for the first rubbing device. FIG. 8(b) illustrates the concept of this operation.

Thereafter, two LCD device-use substrates 4 to which the alignment operation had been already carried out were stuck to each other, and liquid crystal was injected therebetween. Using an STN LCD device thus produced, it was checked whether "irregular display with stripes" occurred. "Irregular display with stripes" with a great magnitude was observed.

The following description will give consideration to the first through third examples, and the comparative example.

First of all, as to the comparative rubbing device as the comparative example, the positions where the root parts fell on had no deviation in the rotation-axis direction of the rubbing roller 10, when the rubbing roller 10 rotated during an alignment operation. Therefore, the central parts of the piles P touched the alignment film 7 in lines at intervals of 414 $\mu$m and 207 $\mu$m. As a result, "irregular display with stripes" caused by uneven strength of the touch of the piles P was observed.

In contrast, as to the first rubbing device, the positions where the root parts of the piles P fell on, during an alignment operation, had the following deviation in the rotation-axis direction of the rubbing roller 1: the positions which the piles P's root parts fell on deviated by 7.2 (=414 sin 1°) $\mu$m and 3.6 (=207 sin 1°) $\mu$m, when the circumferential surface moved by 413.9 (=414 cos 1°) mm and 207.0 (=207 cos 1°) $\mu$m with the rotation of the rubbing roller 1, respectively. This caused portions of the alignment film 7 which were touched by the central parts of the piles P to deviate by 7.2 μm and 3.6 μm when the LCD device-use substrate 4 moved by 5.3 μm and 2.6 μm, respectively. Thus, this arrangement ensured a uniform and thorough alignment. As a result, "irregular display with stripes" was effectually prevented when such a rubbing device was incorporated in an LCD device.

As to the second rubbing device in accordance with the embodiment, the positions where the piles P's root parts fell on had, during an alignment operation, the following deviation in the rotation-axis direction of the rubbing roller 1: the positions which the piles P fell on deviated by 36.1 (=414 sin 5°) μm and 18.0 (=207 sin 5°) μm, when the circumferential surface of the rubbing roller 1 moved by 412.4 (=414 cos 5°) μm and 206.2 (=207 cos 5°) μm with the rotation of the rubbing roller 1, respectively. This caused portions of the alignment film 7 which were touched by the central parts of the piles P to deviate by 36.1 μm and 18.0 μm when the LCD device-use substrate 4 moved by 5.3 μm and 2.6 μm, respectively. As a result, "irregular display with stripes" was effectually prevented when such a rubbing device was incorporated in an LCD device.

As to the third rubbing device in accordance with the embodiment, the positions which the piles P's root parts fell on had, during an alignment operation, the following deviation in the rotation-axis direction of the rubbing roller 1: the positions which the piles P's root parts fell on deviated by 207.0 (=414 sin 30°) μm and 103.5 (=207 sin 30°) μm, when the circumferential surface of the rubbing roller 1 moved by 358.5 (=414 cos 30°) μm and 179.3 (=207 cos 30°) μm with the rotation of the rubbing roller 1, respectively. This caused portions of the alignment film 7 which were touched by the central parts of the piles P to deviate by 207.0 μm and 103.5 μm when the LCD device-use substrate 4 moved by 4.6 μm and 2.3 μm, respectively.

However, with such deviations, the central parts of neighboring piles P, the central parts corresponding to the roots, rubbed portions close to each other on one same line of the alignment film 7, as shown in FIG. 7(b) illustrating the concept of the operation.

More specifically, with the rubbing cloth 2' made of 'YA-18-R', a pile $P_1$ and a pile $P_2$ shown in FIG. 6 rub the alignment film 7 in the same line when a tilt angle of 31.06° is given. The tilt angle is derived as follows, from the intervals of the piles P of the rubbing cloth 2':

$$\tan \phi = 374/(207+414)$$

$$\phi = 31.06°$$

In this case, a pitch z between the piles $P_1$ and $P_2$ is derived as:

$$z = ((207+414)^2 + 374^2)^{1/2} = 724.9 \ \mu m$$

Therefore, the rubbing roller 1' of the third rubbing device of the present embodiment, with the tilt angle φ of 30°, i.e., nearly 31.06°, caused a phenomenon that after a pile rubbed a portion on the alignment film 7, another neighboring pile rubbed a very close portion on the same line. It happened every time when the circumferential surface of the rubbing roller 1' moves by 717.1 μm with the rotation of the rubbing roller 1'. As a result, when such a rubbing device was incorporated in a LCD device, "irregular display with stripes" was observed, although it was not observed with LCD devices incorporating the first and second rubbing devices of the present embodiment.

Table 1 below shows, concerning the first through third rubbing devices in accordance with the embodiment of the present invention and the comparative rubbing device, how often a line with a length of 1 mm which extends on the alignment film 7 in the same direction as the moving direction of the LCD device-use substrate 4 was touched by the central parts of the piles P, and whether "irregular display with stripes" occurred or not.

[TABLE 1]

| Example | Number of Touches | irregular display |
| --- | --- | --- |
| First | 4 | X |
| Second | 18 | X |
| Third | 1095 | O |
| Comparative | 2528 | O |

(X: not observed, O: observed)

Based on the above results, the applicant of the present invention produced, in addition to the above-mentioned devices, many other alignment devices in accordance with the present invention. On each of those devices, the applicant examined how often central parts of piles of rubbing cloths touched a line with a length of 1 mm extending on an alignment film in the same direction as the moving direction of a LCD device-use substrate, and whether "irregular display with stripes" occurred.

As a result, it was found that "irregular display with stripes" occurs to some extent, with not less than 20 touches, whereas it does not occur with less than 20 touches.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An alignment device comprising a rubbing roller composed of a rotary roller and a rubbing cloth, said rubbing cloth being provided on a circumferential surface of said rotary roller and being provided with piles, said alignment device carrying out alignment with respect to an alignment film provided on a liquid crystal display device-use substrate in accordance with rubbing of said piles against said alignment film during each rotation of said rubbing roller so that said alignment film is aligned in a specific direction, wherein:

said piles are provided on said rubbing cloth at cyclic intervals in two directions, the two directions being orthogonal to each other, and said rubbing cloth is provided so that one of the directions of said piles is tilted to a rotation direction of said rubbing roller.

2. The alignment device as set forth in claim 1, wherein said one of the directions of said piles is tilted to the rotation direction of said rubbing roller at an angle of not less than 0.5° and not more than 5°.

3. The alignment device as set forth in claim 1, further comprising substrate transportation means for transporting said liquid crystal display device-use substrate, wherein:

said rubbing roller is provided so that its rotation axis is perpendicular to a moving direction of said liquid crystal display device-use substrate; and said liquid crystal display device-use substrate is transported under said rubbing roller by said substrate transportation means such that a width direction of said liquid crystal display device-use substrate is tilted at a predetermined angle to the moving direction of said liquid crystal display device-use substrate.

4. The alignment device as set forth in claim 2, further comprising substrate transportation means for transporting said liquid crystal display device-use substrate, wherein:

said rubbing roller is provided so that its rotation axis is perpendicular to a moving direction of said liquid crystal display device-use substrate; and said liquid crystal display device-use substrate is transported under said rubbing roller by said substrate transportation means such that a width direction of said liquid crystal display device-use substrate is tilted at a predetermined angle to the moving direction of said liquid crystal display device-use substrate.

5. The alignment device as set forth in claim 1, wherein the tilt angle of the piles, the intervals of the piles on said rubbing cloth, a peripheral velocity of said rubbing roller, and a moving velocity of said liquid crystal display device-use substrate are respectively determined so that central parts of the piles of said rubbing cloth touch, less than 20 times, a line with a length of 1 mm on the alignment film in a same direction as a moving direction of said liquid crystal display device-use substrate.

6. The alignment device as set forth in claim 2, wherein the tilt angle of the piles, the intervals of the piles on said rubbing cloth, a peripheral velocity of said rubbing roller, and a moving velocity of said liquid crystal display device-use substrate are respectively determined so that central parts of the piles of said rubbing cloth touch, less than 20 times, a line with a length of 1 mm on the alignment film in a same direction as a moving direction of said liquid crystal display device-use substrate.

7. The alignment device as set forth in claim 3, wherein the tilt angle of the piles, the intervals of the piles on said rubbing cloth, a peripheral velocity of said rubbing roller, and a moving velocity of said liquid crystal display device-use substrate are respectively determined so that central parts of the piles of said rubbing cloth touch, less than 20 times, a line with a length of 1 mm on the alignment film in a same direction as a moving direction of said liquid crystal display device-use substrate.

8. The alignment device as set forth in claim 4, wherein the tilt angle of the piles, the intervals of the piles on said rubbing cloth, a peripheral velocity of said rubbing roller, and a moving velocity of said liquid crystal display device-use substrate are respectively determined so that central parts of the piles of said rubbing cloth touch, less than 20 times, a line with a length of 1 mm on the alignment film in a same direction as a moving direction of said liquid crystal display device-use substrate.

9. A rubbing cloth, provided on a circumferential surface of a rotary roller so as to compose a rubbing roller, comprising piles thereon, said piles being provided at cyclic intervals in two directions, the two directions being orthogonal to each other, so that one of the directions of said piles is tilted to a rotation direction of the rubbing roller.

10. The rubbing cloth as set forth in claim 9, wherein said one of the directions of said piles is tilted to the rotation direction of said rubbing roller at an angle of not less than 0.5° and not more than 5°.

11. A method for manufacturing a liquid crystal display device, said method comprising:

a first step of transporting a liquid crystal display device-use substrate under a rotated rubbing roller, the liquid crystal display device-use substrate having an alignment film thereon, the rubbing roller being composed of a rotary roller and a rubbing cloth, the rubbing cloth being provided on the circumferential surface of the rotary roller and being provided with piles, the piles being provided at cyclic intervals in two directions orthogonal to each other, one of the two directions of the piles being tilted to a rotation direction of the rubbing roller, so that alignment is carried out with respect to the alignment film in a specific direction in accordance with rubbing of the piles against the alignment film during each rotation of the rubbing roller;

a second step of binding a pair of substrates to each other, at least one of the pair of substrates having gone through the alignment in the first step; and a third step of injecting liquid crystal between the substrates.

12. The method for manufacturing a liquid crystal display device as set forth in claim 11, wherein the liquid crystal display device is a super twisted nematic liquid crystal display device.

13. The method for manufacturing a liquid crystal display device as set forth in claim 11, wherein, in the first step, said one of the directions of said piles is tilted to the rotation direction of said rubbing roller at an angle of not less than 0.5° and not more than 5°.

14. The method for manufacturing a liquid crystal display device as set forth in claim 11, wherein, in the first step, the rubbing roller is provided so that its rotation axis is perpendicular to a moving direction of the liquid crystal display device-use substrate; and the liquid crystal display device-use substrate is transported under the rubbing roller by substrate transportation means such that a width direction of the liquid crystal display device-use substrate is tilted at a predetermined angle to the moving direction of the liquid crystal display device-use substrate.

15. The method for manufacturing a liquid crystal display device as set forth in claim 13, wherein, in the first step, the rubbing roller is provided so that its rotation axis is perpendicular to a moving direction of the liquid crystal display device-use substrate; and the liquid crystal display device-use substrate is transported under the rubbing roller by substrate transportation means such that the width direction of the liquid crystal display device-use substrate is tilted at a predetermined angle to the moving direction of the liquid crystal display device-use substrate.

16. The method for manufacturing a liquid crystal display device as set forth in claim 11, wherein, in the first step, the tilt angle of the piles, the intervals of the piles on said rubbing cloth, a peripheral velocity of said rubbing roller, and a moving velocity of said liquid crystal display device-use substrate are respectively determined so that central parts of the piles of said rubbing cloth touch, less than 20 times, a line with a length of 1 mm on the alignment film in a same direction as a moving direction of said liquid crystal display device-use substrate.

17. The method for manufacturing a liquid crystal display device as set forth in claim 13, wherein, in the first step, the tilt angle of the piles, the intervals of the piles on said rubbing cloth, a peripheral velocity of said rubbing roller, and a moving velocity of said liquid crystal display device-use substrate are respectively determined so that central parts of the piles of said rubbing cloth touch, less than 20 times, a line with a length of 1 mm on the alignment film in a same direction as a moving direction of said liquid crystal display device-use substrate.

18. The method for manufacturing a liquid crystal display device as set forth in claim 14, wherein, in the first step, the tilt angle of the piles, the intervals of the piles on said rubbing cloth, a peripheral velocity of said rubbing roller, and a moving velocity of said liquid crystal display device-use substrate are respectively determined so that central parts of the piles of said rubbing cloth touch, less than 20 times, a line with a length of 1 mm on the alignment film in a same direction as a moving direction of said liquid crystal display device-use substrate.

19. The method for manufacturing a liquid crystal display device as set forth in claim 15, wherein, in the first step, the tilt angle of the piles, the intervals of the piles on said rubbing cloth, a peripheral velocity of said rubbing roller, and a moving velocity of said liquid crystal display device-use substrate are respectively determined so that central parts of the piles of said rubbing cloth touch, less than 20 times, a line with a length of 1 mm on the alignment film in a same direction as the moving direction of said liquid crystal display device-use substrate.

* * * * *